Jan. 7, 1941.　　　P. E. MEDWED　　　2,228,143
MOCCASIN SHOE
Filed Nov. 8, 1939
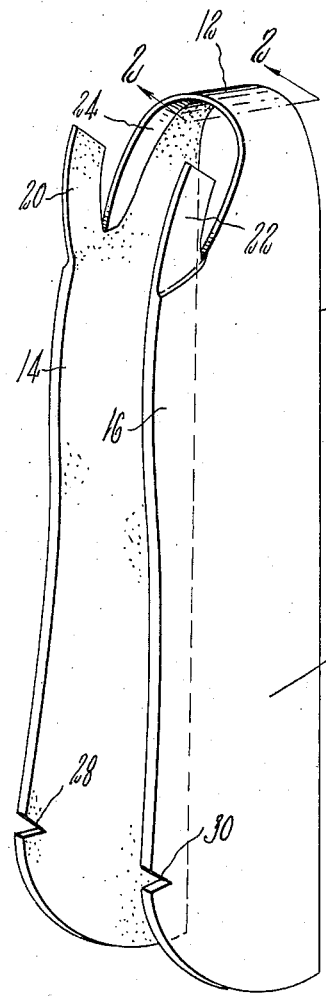
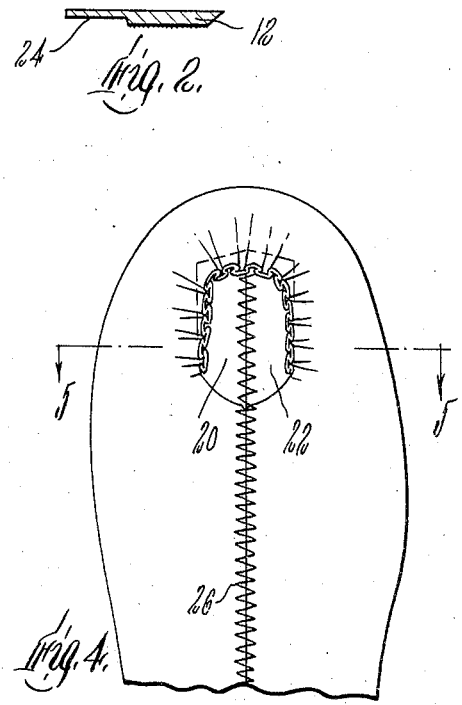
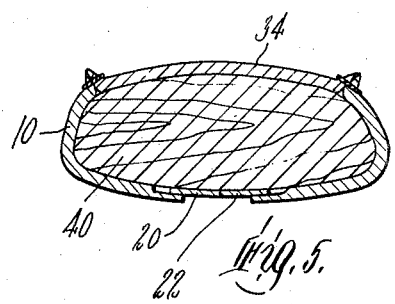
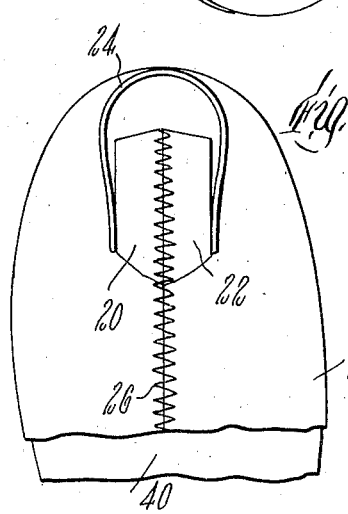
Inventor
Pinchos E. Medwed
by Nathaniel P. Wharton
Atty Patented Jan. 7, 1941

2,228,143

UNITED STATES PATENT OFFICE 2,228,143

MOCCASIN SHOE

Pinchos E. Medwed, Bangor, Maine

Application November 8, 1939, Serial No. 303,419

3 Claims. (Cl. 36—11)

This invention relates to an improved moccasin shoe of the moccasin type.

It is an object of the invention to provide a moccasin shoe which can be simply and easily made by machine stitching. According to the invention, a single elongated piece or strip of leather is cut to shape and bent to form the side walls of the shoe upper, the ends of the strip being joined at the heel to form the rear seam. The strip is so shaped that the marginal portions can be turned in and brought together to form the bottom of the upper. The edges of these marginal portions are butted and joined together by a zig-zag seam extending centrally from the heel nearly to the toe of the bottom of the upper. The toe portion is finished as hereinafter described. A toe piece is stitched to the other edge of the strip to complete the forepart of the upper. Suitable trimming may be added, and an outsole may be stitched or otherwise secured to the upper to complete the shoe.

For a further understanding of the invention, reference may be had to the following description thereof, and to the drawing of which Figure 1 is a perspective view of a leather strip cut to form the major portion of the shoe upper.

Figure 2 is a section on the line 2—2 of Figure 1.

Figures 3 and 4 are bottom plan views showing steps in forming the toe portion of the upper on a last.

Figure 5 is a section on the line 5—5 of Figure 4.

Figure 6 is a side elevation of a finished moccasin, a portion being broken away to show in section.

In making a moccasin shoe according to the present invention, an elongated strip 10 of calf skin, heifer skin, or other suitable soft leather or equivalent material is cut to shape, so that, when the mid-portion 12 is bent around to form the side wall of the toe portion of an upper, marginal portions 14 and 16 of the strip may be turned in and their edges butted together to form the bottom of the upper. The mid-portion or toe-portion of the strip 10 and the adjacent ball-portions are cut by mere incision as indicated in Figure 1, so as to form a pair of tongues 20 and 22, each tongue having one side edge, which is a continuation of the edge of the corresponding marginal portion of the strip, and having an opposite side edge practically parallel thereto, as best shown in Figures 3 and 4. The tongues 20 and 22 are preferably skived or split so as to reduce their thickness to about one-half of the thickness of the strip 10. The adjacent marginal area 24 of the mid-portion 12 of the strip is likewise skived or split so that its thickness is reduced to approximately one-half that of the strip 10.

After the strip 10 has been cut to shape and split to form the thin tongues 20 and 22 and the thin area 24, as described, the edges of the marginal portions 14 and 16 are brought together and joined by a zig-zag seam 26, as indicated in Figures 3 and 4, or by other suitable means. This seam extends from a pair of notches 28 and 30 near the ends of the strip 10 forward to the ends of the tongues 20 and 22, this seam being central in the bottom of the upper. The ends of the strip 10 are joined together to form the rear seam of the shoe, the specific manner of joining these ends being no part of the present invention. A suitable toe piece 34 is stitched to the upper edge 36 of the strip 10 to form the top of the upper. Additional ornamental pieces 38 may be secured to the strip 10 at any convenient stage in the making of the shoe. After the ends of the strip 10 have been joined to form the rear seam of the shoe, the marginal portions 14 and 16 have been joined by the seam 26 to form the bottom of the upper, and the toe piece 34 has been stitched to the upper edge 36 of the strip to form the top of the upper, a last 40 is inserted. The thin area 24 is then overlasted by a suitable bed-lasting machine so as to overlap the tongues 20 and 22, as indicated in Figure 4. The overlapping portions of the area 24 are adhesively or otherwise secured to the tongues. This completes the formation of the bottom of the upper. The last can then be removed and an outsole 42 of any suitable material, such as leather or molded rubber, may be stitched to the upper, a double line 44 of stitching being indicated in Figure 6. If desired, a sock lining 46 may be inserted within the shoe to finish the interior.

It is evident that various modifications and changes may be made in the details of structure of the shoe herein shown and described without departing from the spirit or scope of the invention as defined in the following claims.

I claim:

1. A moccasin shoe comprising an elongated strip of leather forming the sides and bottom of the upper, said strip having its ends joined at the rear seam of the shoe and having marginal portions thereof brought together to form the bottom of the upper, said marginal portions being cut near the toe of the shoe to form a pair of tongues of reduced thickness and a marginal area of reduced thickness at the mid-portion of the strip, one side edge of each tongue being a continuation of the edge of the corresponding marginal portion and the opposite side edge of each tongue being substantially parallel thereto, a line of stitches joining said marginal portions edge-to-edge and extending along the middle of the bottom of the upper from the heel area to the ends of said tongues, said marginal area of reduced thickness being lasted to overlap said tongues, and a toe piece stitched to the other edge of said strip at the forepart of the shoe.

2. In a moccasin shoe, a leather strip forming the side wall of the toe and ball portions of the upper, said strip having turned-in ball portions stitched together to form a central seam in the bottom of the upper, said ball portion being cut with a pair of tongues extending forward along said seam nearly to the toe and of reduced thickness, one side edge of each tongue being a continuation of the edge of the corresponding turned-in ball portion and the opposite side edge of each tongue being substantially parallel thereto, the toe portion of said strip having a margin of reduced thickness overlasted against said tongues and adhesively secured thereto.

3. In a moccasin shoe, a leather strip forming the side wall of the toe and ball portions of the upper, said strip having turned-in ball portions stitched together to form a central seam in the bottom of the upper, said ball portions being cut with a pair of tongues extending forward along said seam nearly to the toe and of reduced thickness, one side edge of each tongue being a continuation of the edge of the corresponding turned-in ball portion and the opposite side edge of each tongue being substantially parallel thereto, the toe portion of said strip having a margin of reduced thickness overlasted against said tongues and adhesively secured thereto, and an outsole secured to the bottom of said upper.

PINCHOS E. MEDWED.